United States Patent Office 3,103,527
Patented Sept. 10, 1963

3,103,527
CYCLIC TRIENE METAL CARBONYL AND
PROCESS FOR PREPARING SAME
Peter L. Pauson, Giffnock, Glasgow, and John D. Munro,
Prestwick, Ayrshire, Scotland, assignors to Ethyl Corporation, New York, N.Y., a corporation of Virginia
No Drawing. Filed Sept. 9, 1960, Ser. No. 54,854
Claims priority, application Great Britain Sept. 14, 1959
10 Claims. (Cl. 260—438)

This invention relates to new organometallic compounds and processes for their preparation. More specifically, this invention relates to new organometallic compounds and processes for their preparation which involve reaction between a tropylium-Group VIB metal-tricarbonyl cation and various anions.

An object of our invention is, therefore, to provide new organometallic compounds and methods for their preparation. A further object of our invention is to provide new organometallic compounds by reacting a tropylium-Group VIB metal-tricarbonyl cation with an anion.

Our invention comprises reacting a tropylium-Group VIB metal-tricarbonyl cation with an anion according to the following reaction scheme

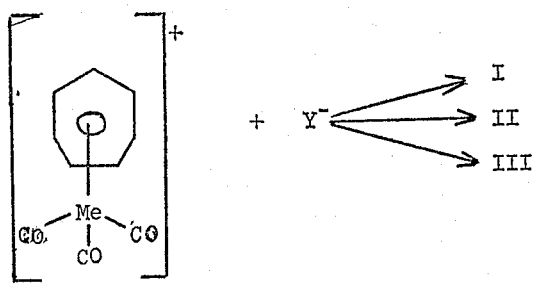

in which Me is a Group VIB metal, e.g. chromium, molybdenum and tungsten. As shown, the reaction can take either of three courses to lead to products denoted as I, II and III. The course which the reaction takes is dependent upon the particular anion, $Y^-$, which is employed. The tropylium-Group VIB metal-tricarbonyl cation reactant may contain various non-reactive hydrocarbon substituent groups on the tropylium ring such as, for example, methyl, ethyl, propyl and butyl.

Our processes, as depicted above, are generally carried out in the presence of an inert solvent and at a temperature between about —20 to about 100° C. Preferably, an ether solvent is employed, and the temperature at which the reaction is conducted is between about zero to about 30° C. Agitation, although not essential, is preferably employed since it insures a more even reaction rate. If desired, the reaction may be conducted at pressures up to about 100 atmospheres. In general, however, the reaction goes well under normal pressure conditions. In many cases, use of an inert atmosphere to blanket the reaction system is desirable since this prevents decomposition of reactants or products through oxidation. Typical inert gases which may be so employed are nitrogen, argon, krypton and neon.

Typical reaction solvents which may be employed in our process are high boiling saturated hydrocarbons such as n-octane, n-decane, and other paraffinic hydrocarbons such as hexane, heptane and the like. Typical aromatic solvents are mesitylene, benzene, toluene, xylenes, either pure or mixed, and the like. Typical ether solvents are ethyl octyl ether, ethyl hexyl ether, diethylene glycol methyl ether, diethylene glycol diethyl ether, diethylene glycol dibutyl ether, ethylene glycol dimethyl ether, ethylene glycol diethyl ether, trioxane, tetrahydrofuran, ethylene glycol dibutyl ether and the like. Ester solvents which may be employed include pentyl butanoate, ethyl decanoate, ethyl hexanoate, and the like. Silicone oils such as the dimethyl polysiloxanes, bis(chlorophenyl) polysiloxanes, hexapropyl disilane, and diethyldipropyl-diphenyldisilane may also be employed. Other ester solvents are those derived from succinic, maleic, glutaric, adipic, pimelic, suberic, azelaic, sebacic and pinic acids. Specific examples of such esters are di-(2-ethylhexyl) adipate, di-(2-ethylhexyl) azelate, di-(2-ethylhexyl) sebacate, di-(methylcyclohexyl) adipate and the like.

As shown above, tropylium-Group VIB metal-tricarbonyl cation is one of the reactants in our process. To provide a source of this cation, it is necessary to use a salt of said cation as a reactant. In general, any salt of said cation may be employed providing the anion does not undergo a reaction with the attacking anion, $Y^-$. Typical of suitable tropylium-Group VIB metal-tricarbonyl cation salts are the fluoride, chloride, bromide, iodide, sulfate, tetrachloromercurate, tetrachlorogallate, hexachloroplatinate or salts of a fairly strong organic acid such as the picrate. In general, the tropylium-Group VIB metal-tricarbonyl cation salt is not a salt of a weak acid since the anions of weak acids do not form salts with the cation but rather react with it to give products I or II as described later. Preferred salts are the tropylium-Group VIB metal-tricarbonyl perchlorate and the fluoborate.

Customarily, molar excess of the attacking anion, $Y^-$, is employed in the reaction. This tends to force the reaction to completion so as to give a fairly high percentage of a single product. Even under these conditions, however, the process is generally not so specific as to produce only a single product I, II, or III. In those cases where an excess of the tropylium-Group VB metal-tricarbonyl cation is employed, the reaction product comprises more of a mixture of products such as I and III or I and II.

As shown above, one course which our process takes is to produce product I. This reaction is essentially a substitution reaction, and product I can be depicted as having the following formula:

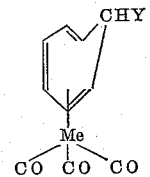

As shown in the above formula, Me is a Group VIB metal (chromium, molybdenum or tungsten), and Y is a substituent group resulting from neutralization of the attacking anion, $Y^-$, after bonding to the positively charged tropylium-Group VIB metal-tricarbonyl cation. Most anions will react with a tropylium-Group VIB metal-tricarbonyl cation to form product I. Typical of such anions are $H^-$, $\overline{ZO}$, $\overline{CN}$, $\overline{CRR'R''}$, and $\overline{SZ}$ where R, R' and R" may be hydrogen, lower alkyl, lower aryl, carboxy-lower alkyl ester groups, lower alkylcarbonyl and lower aryl-carbonyl groups. Z is a lower alkyl, lower aryl or hydrogen. Examples of such anions are methoxy, ethoxy, propoxy, butoxy, phenoxy, carboxyethyl, carboxymethyl, ethylthio, methylthio, phenylcarbonyl, methylcarbonyl, ethylcarbonyl, phenylthio and the like.

To further illustrate the scope of our process to give a substitution product I, as shown above, there are presented the following examples in which all parts and percentages are by weight unless otherwise indicated.

*Example I*

A mixture comprising six parts of cycloheptatriene, five parts of chromium hexacarbonyl and 23.6 parts of diethylene glycol dimethyl ether were heated at reflux for fourteen hours. After removal of the solvent by heating under reduced pressure, 3.16 parts of the product, cycloheptatriene chromium tricarbonyl were recrystallized from light petroleum. The product exists as red needles melting at 129–130° C. Found: C, 52.60; H, 3.6 and O, 20.7. Calculated for $C_{10}H_8CrO_3$: C, 52.6; H, 3.5, and O, 21.0 percent. The compound is soluble in all common organic solvents.

*Example II*

Four parts of the cycloheptatriene chromium tricarbonyl, prepared as in Example I, were dissolved in 133.6 parts of methylene chloride, and 4.7 parts of triphenylmethyl fluoborate in 6.7 parts of methylene chloride were added. There precipitated 5.3 parts of tropylium chromium tricarbonyl fluoborate which was recrystallized from acetone. The product is soluble in water and is very slightly soluble in methylene chloride. It darkens when heated above 230° C., but it does not melt at temperatures below 300° C. Found: C, 39.25 and H, 2.5. Calculated for $C_{10}H_7BCrF_4O_3$: O, 38.25 and H, 2.25 percent.

*Example III*

Eighty-six hundredths parts of cycloheptatriene chromium tricarbonyl in 6.7 parts of methylene chloride were treated with 1.5 parts of triphenylmethyl perchlorate in 26.7 parts of methylene chloride. There precipitated 1.25 parts of tropylium chromium tricarbonyl perchlorate which was recrystallized from acetone. It formed red needles which darkened above 270° C. but did not melt below 300° C. It exploded violently during an attempted carbon and hydrogen analysis, and it is also readily detonated by friction. It is soluble in water, very sparingly soluble in methylene chloride, ether or tetrahydrofuran and is insoluble in petrol or benzene.

An aqueous solution of tropylium chromium tricarbonyl perchlorate was treated with a saturated solution of Reineke salt to quantitatively precipitate the Reineckate of tropylium chromium tricarbonyl which forms as orange needles from acetone. Found: C, 29.7; H, 2.7; O, 9.3 and N, 15.6. $C_{14}H_{13}Cr_2N_6O_3S_4$ requires: C, 30.8; H, 2.4; O, 8.8 and N, 15.4. It is insoluble in water and in ether and is slightly soluble in alcohol.

An aqueous solution of tropylium chromium tricarbonyl perchlorate, when treated with an excess of a solution of potassium triiodide, quantitatively precipitated tropylium chromium tricarbonyl triiodide which forms brown needles from acetone and decomposes above 150° C. Found: C, 19.7; H, 1.2; O, 7.8 and I, 62.9 percent. $C_{10}H_7CrI_3O_3$ requires: C, 19.7; H, 1.2; O, 7.9 and I, 62.4 percent.

*Example IV*

A solution comprising 0.756 part of tropylium chromium tricarbonyl perchlorate in 150 parts of water was mixed with a solution comprising 0.20 part of potassium cyanide in five parts of water. After mixing the two solutions, they were left at room temperature for 10 minutes. The mixture was then extracted with ether, and the ether layer was washed thoroughly with water and dried over sodium sulfate. After removal of the ether, the residue was dissolved in a mixture of ligroin and benzene (1:1) and chromatographed on alumina using a 1:1 mixture of ligroin and benzene as the eluent. Three products were obtained as follows:

0.163 part of ditropyl chromium tricarbonyl were obtained as orange needles which were crystallized from light petroleum. Its melting point was 148–149° C. and it is soluble in all common organic solvents. Found: C, 63.9 and H, 4.5. $C_{17}H_{14}CrO_3$ requires: C, 64.1 and H, 4.4 percent.

0.086 part of ditropyl bis(chromium tricarbonyl) were obtained by crystallizing from benzene or acetone. This compound has a melting point of 223–225° C. with decomposition. It is almost insoluble in ligroin, methylene chloride and chloroform and is slightly soluble in ether and tetrahydrofuran. Found: C, 52.8 and H, 3.5. $C_{20}H_{14}Cr_2O_6$ requires: C, 52.9 and H, 3.1 percent.

0.105 part of 7-cyano-1,3,5-cycloheptatriene chromium tricarbonyl were obtained as deep-red needles by crystallizing from ether-ligroin solvent. The compound has a melting point of 118–119° C. and is soluble in benzene, ether and ethanol. It is almost insoluble in ligroin or methylene chloride and shows absorption in the C≡N stretching region of the infrared spectrum at 2229 cm.$^{-1}$ (KBr disc). Found: C, 52.0; H, 3.0 and N, 5.7. $C_{11}H_7NO_3Cr$ requires: C, 52.2; H, 2.8 and N, 5.5 percent.

*Example V*

1.013 parts of tropylium chromium tricarbonyl perchlorate and 0.5 part of potassium cyanide were refluxed in 23.6 parts of ethanol for one hour. After evaporation of the solvent under reduced pressure, the residue was extracted with petrol. The extract on chromatography yielded 0.020 part of ditropyl chromium tricarbonyl. The remaining product was dissolved in benzene and, after filtration, the benzene-soluble products were chromatographed to yield 0.28 part of ditropyl bis(chromium tricarbonyl) and 0.097 part of 7-cyano-1,3,5-cycloheptatriene chromium tricarbonyl. The identity of each of these products was established by means of a melting point, mixed melting point and infrared comparison with the products obtained in Example IV. Repetition of Example V using a longer reaction time resulted in lower yields of 7-cyano-1,3,5-cycloheptatriene chromium tricarbonyl.

*Example VI*

One part of methylcycloheptatriene chromium tricarbonyl was prepared from one part of methylcycloheptatriene and 2.1 parts of chromium hexacarbonyl in diethylene glycol dimethyl ether by heating at reflux for six hours. The methylcycloheptatriene chromium tricarbonyl was admixed with 10.7 parts of methylene chloride and treated with two parts of triphenylmethyl perchlorate in 33.4 parts of methylene chloride. There precipitated methyltropylium chromium tricarbonyl perchlorate which was recrystallized from acetone. The compound forms red needles which darken above 270° C. and do not melt below 300° C. It is soluble in water, very sparingly soluble in methylene chloride, ether and tetrahydrofuran and insoluble in ligroin and benzene. For characterization, an aqueous solution of methyltropylium chromium tricarbonyl perchlorate was treated with excess aqueous potassium triiodide to precipitate methyltropylium chromium tricarbonyl triiodide. This compound crystallizes from acetone as brown needles and decomposes above 150° C. Found: C, 21.5 and H, 1.6. $C_{11}H_9O_3I_3Cr$ requires: C, 21.2 and H, 1.5 percent.

*Example VII*

One part of tropylium chromium tricarbonyl perchlorate dissolved in 15.9 parts of methanol was added to a solution comprising 0.2 part of sodium in 7.96 parts of methanol. The mixture was left at room temperature for two hours after which the solvent was removed under reduced pressure, and the residue was extracted with petrol. Evaporation of the petrol extract yielded 0.695 part of methoxycycloheptatrienyl chromium tricarbonyl which was crystallized from petrol as orange needles having a melting point of 107–109° C. Found: C, 51.5 and H, 4.05. $C_{11}H_{10}CrO_4$ requires: C, 51.2 and H, 3.9 percent.

*Example VIII*

0.7 part of dimethylfulvene in 7.1 parts of ether was added dropwise to methyllithium prepared from one part of methyliodide and 0.11 parts of lithium in five parts of ether. During the addition, the mixture was kept cool by occasional immersion of the reaction vessel in cold water. After the addition, 0.43 parts of tropylium chromium tricarbonyl perchlorate were added, and there immediately resulted the formation of a deep-red colored solution and the liberation of heat. The mixture was left overnight, and the solvent was then removed under reduced pressure. The red residue was extracted with petroleum ether (B.P. 40–60° C.). Chromatography of this extract on alumina and elution with the same solvent, i.e., petroleum ether, yielded 0.063 part of tert-butylcyclopentadienylcycloheptatriene chromium tricarbonyl by crystallization from petroleum ether as red needles having a melting point of 129–130° C. Found: C, 65.4 and H, 6.2. $C_{19}H_{20}O_3Cr$ requires: C, 65.5 and H, 5.9 percent. The compound exhibited maximum peaks in the carbonyl stretching region of the I.R. spectrum at 1973, 1911 and 1861 cm.$^{-1}$ (KBr disc.).

*Example IX*

To a solution of the tropylium chromium tricarbonyl perchlorate (1 gram) in water (250 cc.) was added sodium borohydride (.38 gm.) with stirring. The resulting red mixture was extracted with ether and the red ether extract dried over $Na_2SO_4$. Evaporation of the ether to dryness gave a red solid which was dissolved in light petrol and chromatographed on alumina. Elution with petrol gave cycloheptatriene chromium tricarbonyl (.39 g., 56 percent) as red needles, M.P. 129–130°. Melting point, and mixed melting point and infrared comparison with an authentic sample of cycloheptatriene chromium tricarbonyl showed the compounds to be identical.

*Example X*

Tropylium chromium tricarbonyl perchlorate (2 gm.) and diethyl sodiomethylmalonate (2.36 gm.), prepared from sodium metal (.276 gm.) ethyl alcohol (10 cc.) and diethyl methylmalonate (2.8 gm.) in tetrahydrofuran (50 cc.) were reacted at room temperature overnight. The solvent was stripped in vacuo and the red residue extracted with light petrol. Chromatography on alumina gave a single red band which on elution with petrol yielded a red crystalline solid (1.94 gm., 79 percent). Recrystallization from light petrol gave diethyl methylmalonylcycloheptatrienylchromium tricarbonyl as orange red needles, M.P. 91–92° C. On analysis, there was found: C, 51.1; H, 5.0 percent. $C_{18}H_{20}O_7Cr$ requires: C, 54.0, H, 5.0 percent.

As shown previously, our process may, depending on the anionic reactant, $Y^-$, produce a product II. This product is selected from the group consisting of a ditropyl-Group VIB metal-tricarbonyl compound and a ditropyl bis(Group VIB metal-tricarbonyl). This reaction may be termed a coupling reaction since it involves the coupling together of two tropylium moieties. The anions, $Y^-$, which react with a tropylium-Group VIB metal-tricarbonyl cation to produce coupling, are as follows:

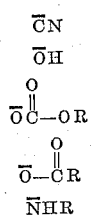

and

In the above list of anions, R denotes a lower alkyl or a lower aryl group. Typical of such anions are hydroxy, cyano, methoxycarbonyloxy, ethoxycarbonyloxy, butoxycarbonyloxy, phenoxycarbonyloxy, methylamino, phenylamino, ethylamino, butylamino, ethylcarboxy, phenylcarboxy, phenyl, methyl, ethyl, propyl, tolyl and the like. As stated previously, our process does not generally produce only a single product. Thus, there is some overlap among the anions denoted as producing product I and those denoted as producing product II. The reason for this is that certain anions (see, for example, the cyano ion in Example IV and V) produce a mixture of products I and II.

Another type of reactant which will produce coupling (product II) by reaction with a tropylium-Group VIB metal-tricarbonyl cation are non-ionic Lewis bases capable of donating a pair of electrons to the cation. Typical of such Lewis bases are the amines such as methyl amine, ethyl amine, phenyl amine, dimethylamine and the like.

To further illustrate the scope of our process to produce product II (coupling), there are presented the following examples in which all parts and percentages are by weight unless otherwise indicated.

*Example XI*

An aqueous solution containing 0.41 part of tropylium chromium tricarbonyl perchlorate was treated with excess aqueous sodium bicarbonate. After standing for a few minutes at room temperature, the mixture was extracted with ether to yield 0.233 part of a red solid after evaporation of the washed and dried ether extract. This solid was chromatographed as in Example IV and V to yield 0.104 part of ditropyl chromium tricarbonyl and 0.076 part of ditropyl bis(chromium tricarbonyl). These products were identified by means of melting point, mixed melting point and infrared comparison with the products obtained in Example IV and V.

*Example XII*

Tropylium chromium tricarbonyl perchlorate (1 gm.) in anhydrous methanol (50 cc.) and anhydrous sodium acetate (.25 gm.) in methanol (10 cc.) were refluxed for one hour. The red mixture was filtered to remove 0.28 gram of a red crystalline solid [ditropyl-bis(chromium tricarbonyl)] which was recrystallized from acetone as red needles, M.P. 218–220°. Mixed M.P. and infrared comparison with ditropyl-bis-(chromium tricarbonyl) showed no depression. The red methanol solution was evaporated to dryness and gave a red residue (.138 g.). Chromatography of this red solid on alumina and elution with light petrol gave 130 mg. of an orange-red crystalline solid (ditropyl chromium tricarbonyl), M.P. 148–149° identical in M.P. and mixed M.P. with the compound previously reported as ditropyl chromium tricarbonyl in Examples IV and V.

*Example XIII*

Sodamide (0.22 gm.), prepared from sodium (0.14 gm.) and liquid ammonia (20 cc.), in T.H.F. (tetrahydrofuran) (50 cc.) was reacted with tropylium chromium tricarbonyl perchlorate (1 gm.) at room temperature overnight. The mixture was then filtered and the red tetrahydrofuran solution was evaporated to dryness. The red crystalline residue (87 mg.) was dissolved in petrol benzene (1:1) and chromatographed on alumina (80 g.) to give two bands. The first band yielded 47 mg. of orange-red crystals, M.P. 148–149°. On the basis of its melting point and infrared spectrum, the compound was identified as ditropyl chromium tricarbonyl. Further elution with light petrol gave 38 mg. of ditropyl-bis-(chromium tricarbonyl) as red needles, M.P. 218–220°. Extraction of the tetrahydrofuran insoluble residue with benzene and chromatography on alumina gave a single red band which was readily eluted with benzene and gave an additional 0.325 gms. of ditropyl-bis-(chromium tricarbonyl).

*Example XIV*

Tropylium chromium tricarbonyl perchlorate (.65 gm.) in water (80 cc.) and benzamide (.24 gm.) were heated at 80° C. for 6 hours. The reaction mixture was then extracted with ether and the orange-red extract was evaporated to dryness leaving an orange residue. The residue was dissolved in petrol benzene (1:1) and chromatographed on alumina to give two bands. The first band yielded 74 mg. of ditropyl chromium tricarbonyl, M.P. 148–149°. Further elution with petrol:benzene gave 0.303 gm. of ditropyl-bis-(chromium tricarbonyl).

*Example XV*

To a solution of phenyllithium, prepared in ether (3 ml.) from lithium (0.12 gm.) and bromobenzene (1.57 gm.) was added a suspension of 2 gm. of tropylium chromium tricarbonyl perchlorate in 20 ml. of ether. An immediate exothermic reaction took place and the mixture was stirred at room temperature overnight. After the removal of solvent in vacuo the residue was extracted with ligroin and chromatographed on alumina. Elution with the same solvent yielded orange crystals (0.113 gm.), M.P. 148–149°, which were identified as ditropylium-chromium tricarbonyl by mixed M.P. and infrared comparison.

The ligroin insoluble material was extracted with benzene and chromatographed on alumina to yield 0.465 gm. of ditropyl-bis-(chromium tricarbonyl).

Our process, as defined previously, can also produce a further type of product (III) if the proper anion, Y⁻, is employed as a reactant. Product III is an arene-Group VIB metal-tricarbonyl compound such as benzene-chromium-tricarbonyl.

The formation of product III is believed to occur by expulsion of a CH moiety from the tropylium ring of the tropylium-Group VIB metal-tricarbonyl cation. As a result, the tropylium ring contracts to form an arene ring which is bonded to a Group VIB metal that is further bonded to three carbonyl groups.

Although not bound by any theory, the reaction is believed to occur through the following mechanism:

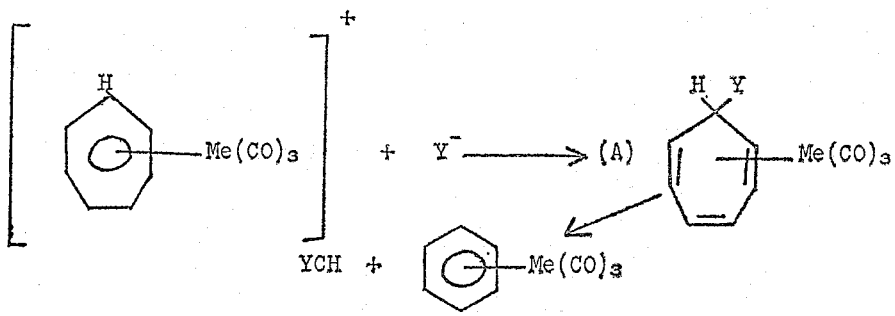

As shown, the tropylium-Group VIB metal-tricarbonyl cation reacts with an appropriate anion, Y⁻, to form an addition product, A. Product A decomposes by expulsion of a CHY group from the cycloheptatriene ring. There results the formation of an arene-Group VIB metal-tricarbonyl compound and a compound, YCH. This theory of the reaction has been confirmed to some extent by using an excess of the tropylium-Group VIB metal-tricarbonyl cation and obtaining both addition product (A) and an arene-Group VIB metal-tricarbonyl compound in the reaction product. Treatment of addition product A with the anion, Y⁻, converts product A to an arene-Group VIB metal-tricarbonyl compound.

Typical anions, Y⁻, which react with a tropylium-Group VIB metal-tricarbonyl cation to produce product III are as follows (a)

$$\overline{C}H \begin{array}{c} C-T \\ \parallel \\ O \end{array} \begin{array}{c} \\ \diagdown \\ C-T \\ \parallel \\ O \end{array}$$

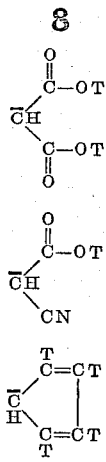

in which T is hydrogen, a lower alkyl group or a lower aryl group. These anions all have an electron withdrawing group attached to the negatively charged carbon atom, $\overline{C}$, such that the hydrogen atom attached to the charged carbon atom is activated and made acidic. These conditions are necessary if the anion is to cause ring contraction and formation of an arene-Group VIB metal-tricarbonyl compound (III). One form of electron withdrawing group, as shown, contains an unsaturated bond which is located alpha to the negatively charged carbon atom, $\overline{C}$.

As described previously, the CH moiety, which is expelled from the seven carbon ring, is believed to become bonded to the Y group to form another product in addition to the arene-Group VIB metal-tricarbonyl compound (III). This product which would have the formula YCH is believed to have the following structures corresponding with the anions, a—d, set forth above.

(a)

$$CH_2=C \begin{array}{c} C-T \\ \parallel \\ O \\ \\ C-T \\ \parallel \\ O \end{array}$$

(b) 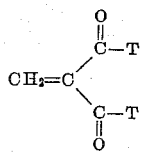

(c) 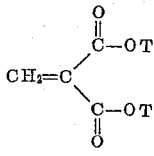

(d) 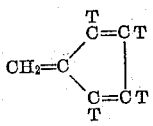

To further illustrate the scope of our reaction to produce ring contraction (product III), there are presented the following examples in which all parts and percentages are by weight unless otherwise indicated.

*Example XVI*

2.80 parts of tropylium chromium tricarbonyl perchlorate suspended in 44.4 parts of tetrahydrofuran were added to cyclopentadienyl sodium that had been prepared in tetrahydrofuran from 0.5 part of sodium and 5.64 parts of cyclopentadiene. The mixture was then stirred overnight at room temperature. The solvent was removed in vacuo, and the residue was extracted with ether. The extract was evaporated, and the residue was sublimed to yield 0.86 part of benzene chromium tricarbonyl. The compound was formed as yellow needles having a melting point of 159–160° C. Found: C, 50.4; H, 2.4, and O, 21.6. Its molecular weight was 215 (cryoscopic in benzene). $C_9H_6CrO_3$ requires: C, 50.5; H, 2.8, and O, 22.4 percent, with a molecular weight of 214. The identity of the compound was further established by means of a mixed melting point and infrared comparison with an authentic sample of benzene chromium tricarbonyl. Essentially the same result was obtained when Example XVI was repeated with addition of 5.2 parts of mesitylene to the cyclopentadiene before the reaction.

*Example XVII*

An excess of cyclopentadienyl sodium prepared from 1.6 parts of cyclopentadiene and 0.2 part of sodium wire in 35.6 parts of tetrahydrofuran was added at room temperature to 0.8 part of methyltropylium chromium tricarbonyl perchlorate prepared as in Example VI. The mixture was left overnight. After removal of the solvent under reduced pressure, the red-brown mixture was extracted with light petroleum. Evaporation of the yellow extract and recrystallization of the residue from light petroleum solvent yielded 0.28 part of toluene chromium tricarbonyl as bright-yellow needles having a melting point of 81–82° C. The identity of the compound was verified by means of a mixed melting point determination with an authentic sample of toluene chromium tricarbonyl prepared from reaction of toluene and chromium hexacarbonyl. Found: C, 52.7 and H, 3.7. Calculated for $C_{10}H_8O_3Cr$: C, 52.7 and H, 3.5 percent.

*Example XVIII*

Methylcyclopentadienylsodium (.006 mole) was prepared by stirring sodium wire (0.14 gm.) with methylcyclopentadiene (0.5 gm.) in tetrahydrofuran for three hours at room temperature. Tropylium chromium tricarbonyl perchlorate (1 gm.) was then added and the mixture was stirred overnight. The solvent was then stripped in vacuo and the brown residue was extracted with petrol. Evaporation of the yellow petrol extract to dryness gave 0.286 gm. of yellow crystals of benzene chromium tricarbonyl (44 percent yield) having a melting point of 159–160° C. Mixed M.P. and infrared comparison with an authentic specimen of benzene chromium tricarbonyl showed the compounds to be identical.

*Example XIX*

Cycloheptatriene (2 gm.) and molybdenum hexacarbonyl (6 gm.) were refluxed in 30 cc. petroleum ether at 100–120° C. for 18 hours. The solvent was then stripped in vacuo and the red residue was chromatographed on alumina. Elution with light petrol removed the single red band of cycloheptatriene molybdenum tricarbonyl as red plates (2.1 gm.) having a melting point of 100–101° C.

*Example XX*

Cycloheptatrienemolybdenum tricarbonyl (1 gm.) in methylene chloride (5 cc.) was treated with trityl perchlorate (1.5 gm.) in methylene chloride (50 cc.). There was obtained an immediate precipitate of tropylium molybdenum tricarbonyl perchlorate as a yellow orange solid (1.29 gm., 95 percent yield). Recrystallization from acetone gave orange needles which decompose explosively ~80° C., were soluble in water, sparingly soluble in methylene chloride, ether and tetrahydrofuran and insoluble in petrol or benzene. The compound is readily detonated by heat and friction. An aqueous solution of the perchlorate was treated with Reinecke salt and a quantitative yield of the Reineckate was obtained as an orange solid. Recrystallization from acetone gave orange plates which decomposed at about 170° C. but did not melt below 300° C. On analysis, there was found: C, 28.7; H, 2.2; N, 14.1 percent. $C_{14}H_{13}O_3S_4N_6MoCr$ requires: C, 28.5; H, 2.2; N, 14.3 percent. An aqueous solution of the perchlorate when treated with an excess of a solution of potassium triiodide quantitatively precipitated the triiodide. The crystals were washed with carbon tetrachloride to remove free iodine and recrystallized from acetone as brown plates which underwent decomposition from 100° C. but did not melt below 320° C. The compound is insoluble in water but slightly soluble in alcohol or methylene chloride. On analysis, there was found: C, 18.5; H, 1.2 percent. $C_{10}H_7I_3O_3Mo$ requires: C, 18.8; H, 1.1 percent.

*Example XXI*

Sodium wire (.5 gm.) in tetrahydrofuran (100 cc.) was reacted with cyclopentadiene (1.6 gm.) in tetrahydrofuran (5 cc.) at room temperature for two hours. Tropyliummolybdenum tricarbonyl perchlorate (2.2 gm.) was then added and the mixture stirred overnight. The solvent was stripped in vacuo and the brown residue extracted with light petrol. Evaporation of the pale yellow extract in vacuo gave 0.21 gm. of benzene molybdenum tricarbonyl as yellow crystals having a M.P. of 118–124° d. Mixed M.P. and infrared comparison with an authentic sample of benzene molybdenum tricarbonyl showed the compounds to be identical.

*Example XXII*

Sodium cyclopentadienide (0.2 mole) was prepared from sodium wire (4.6 gm.) and cyclopentadiene (13.2 gm.) in tetrahydrofuran (100 cc.) and a portion, 1.2 cc., was added to a suspension of 1 gm. of tropylium chromium tricarbonyl perchlorate in 25 cc. of tetrahydrofuran and the mixture was stirred at room temperature overnight. Filtration, followed by evaporation of the tetrahydrofuran solution yielded a red gum (.033 gm.) which was dissolved in ligroin:benzene (9:1) and chromatographed on alumina. Elution with the same solvent gave 8 mg. benzenechromium tricarbonyl having a melting point of 162–163° C. Also obtained was an orange-red gum (0.27 gm.) which crystallized with difficulty from ligroin ether mixtures as an orange amorphous solid having a M.P. of 108–114° (d). This compound is presumably a mixture of isomers of cyclopentadienylcycloheptatrienechromium tricarbonyl (Found: C, 61.3; H, 4.2.

$$C_{15}H_{12}CrO_3$$

requires: C, 61.6; H, 4.1). 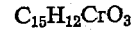

*Example XXIII*

Diethylmalonate (1.28 gm.) was added to sodium ethoxide (.006 mole) prepared from sodium metal (.138 gm.) and ethyl alcohol (5 cc.) and the mixture was stirred for 30 minutes. Tetrahydrofuran (20 cc.) was then added together with tropylium chromium tricarbonyl perchlorate (1 gm.) and the mixture was stirred overnight. The solvent was distilled in vacuo and the red residue extracted with light petrol. Evaporation of the red petrol extract gave a red residue (163 mg.) which was dissolved in petrol and chromatographed on alumina. Elution with light petrol gave benzene chromium tricarbonyl as a yellow crystalline solid (42 mg.), M.P. 162–163°. Mixed melting point and infrared comparison with an authentic specimen of benzene chromium tricarbonyl showed the compounds to be identical.

Further elution with petrol gave orange crystals of diethylmalonyl cycloheptatrienylchromium tricarbonyl (98 mg.). Recrystallization from light petrol gave orange needles, M.P. 122–123° C. On analysis, there was found: C, 52.8; H, 4.8 percent. Calculated for $C_{17}H_{18}O_7Cr$: C, 52.8; H, 4.7 percent.

Use of excess tropylium chromium tricarbonyl perchlorate gave, as shown above, a mixture of benzene chromium tricarbonyl and diethylmalonyl cycloheptatrienylchromium tricarbonyl. This tends to substantiate our theories as to the reaction mechanism since benzene chromium tricarbonyl has resulted from expulsion of a CH group from the seven-carbon ring while diethylmalonyl cycloheptatrienechromium tricarbonyl is simply an addition product. As shown in the next example, further treatment of diethylmalonyl cycloheptatrienylchromium tricarbonyl with diethylsodiomalonate converts it to benzene chromium tricarbonyl.

*Example XXIV*

Diethylmalonylcycloheptatrienyl chromium tricarbonyl (.181 gm.) and diethyl sodiomalonate (.003 mole) prepared from sodium metal (.076 gm.) and diethylmalonate (1 gm.) were allowed to react at room temperature overnight. The solvent was then distilled in vacuo and the orange residue extracted with light petrol. Chromatography of the orange extract of alumina and elution with petrol gave benzene chromium tricarbonyl as yellow crystals (38 mg., 39 percent), M.P. 162–163°. Mixed melting point and infrared comparison with an authentic specimen of benzene chromium tricarbonyl showed the compounds to be identical.

Among the important uses of our compounds is their use as fuel and oil additives. For example, they are useful antiknocks when added to gasoline. They may be used as primary antiknocks in which they are the major antiknock component in the fuel or as supplemental antiknocks. When used as supplemental antiknocks, they are present as the minor antiknock component in the fuel in addition to a primary antiknock such as a tetraalkyllead compound. Typical alkyllead compounds are tetraethyllead, tetrabutyllead, tetramethyllead and various mixed lead alkyls such as dimethyldiethyllead, diethyldibutyllead and the like. When used as either a supplemental or primary antiknock, our compounds may be present in the gasoline in combination with typical scavengers such as ethylene dichloride, ethylene dibromide, tricresylphosphate, trimethylphosphate and the like.

The compounds of our invention have further utility as additives to residual and distillate fuels generally, e.g., jet fuels, home heater fuels and diesel fuels, to reduce smoke and/or soot formation. Also, they may be employed as additives to lubricating oils in which case they act to improve the lubricity of the base oil.

Our compounds are further useful in many metal plating applications. In order to effect metal plating using the compounds, they are decomposed in an evacuated space containing the object to be plated. On decomposition, they lay down a film of metal on the object. The gaseous plating may be carried out in the presence of an inert gas so as to prevent oxidation of the plating metal or the object to be plated during the plating operations.

The gaseous plating technique described above finds wide application in forming coatings which are not only decorative but also protect the underlying substrate material.

Deposition of metal on a glass cloth illustrates the applied process. A glass cloth band weighing one gram is dried for one hour in an oven at 150° C. It is then placed in a tube which is devoid of air and there is added to the tube 0.5 gram of benzene chromium tricarbonyl. The tube is heated at 400° C. for one hour after which time it is cooled and opened. The cloth has a uniform metallic grey appearance and exhibits a gain in weight of about 0.02 gram.

A further utility for our compounds is as drying agents in which case the compounds are incorporated in paints, varnish, printing inks, synthetic resins of the drying oil type, oil enamels and the like. A still further utility for our compounds is their use as chemical intermediates in the preparation of metal-containing polymeric materials or in the preparation of new organic materials.

Another utility for our compounds is as additives to solid propellants so as to modify the burning rate of the propellant material.

Having fully defined the novel compounds of our invention, their mode of preparation and their many utilities, we desire to be limited only within the lawful scope of the appended claims.

We claim:

1. Process for the formation of compounds selected from the class consisting of ditropyl Group VIB metal tricarbonyls and ditropyl bis(Group VIB metal tricarbonyl) compounds said process comprising reacting an attacking reactant with a hydrocarbon tropylium Group VIB metal-tricarbonyl cation selected from the class consisting of tropylium Group VIB metal tricarbonyl cations having 10 to 14 carbon atoms, said cation being derived from a salt consisting of said cation and an anion, said anion being non-reactive toward said attacking reactant, said attacking reactant being selected from the group consisting of (1) anions having the formulae

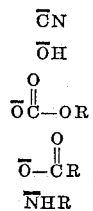

and $\bar{R}$ in which R is selected from the group consisting of lower alkyl groups having one to four carbon atoms and the lower aryl groups phenyl and tolyl and (2) non-ionic amines and benzamide.

2. Process for the formation of arene Group VIB metal tricarbonyl compounds, said process comprising reacting an attacking reactant anion with a hydrocarbon tropylium-Group VIB metal-tricarbonyl cation selected from the class consisting of tropylium Group VIB metal tricarbonyl cations having 10 to 14 carbon atoms, said cation being derived from a salt consisting of said cation and an anion, said anion being non-reactive toward said attacking reactant anion, said attacking reactant anion containing a negatively charged terminal carbon atom having attached thereto a hydrogen atom and an electron withdrawing group which activates said hydrogen atom and makes it acidic.

3. Process for the formation of cycloheptatriene Group VIB metal tricarbonyls, said process comprising reacting an attacking reactant anion with a hydrocarbon tropylium Group VIB metal-tricarbonyl cation selected from the class consisting of tropylium Group VIB metal tricarbonyl cations having 10 to 14 carbon atoms, said cation being derived from a salt consisting of said cation and an anion, said anion being non-reactive toward said attacking reactant anion, said attacking reactant anion selected from the group consisting of

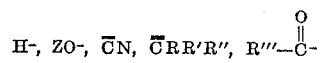

and SZ−, in which R, R′ and R″ are selected from the group consisting of hydrogen, lower alkyl groups having one to four carbon atoms, the phenyl and tolyl radicals, carbomethoxy, carbethoxy, carbopropoxy and carbobutoxy radicals, and R‴ is selected from the class consisting of lower alkyl groups having one to four carbon atoms and the phenyl and tolyl radicals, and Z is selected from the group consisting of hydrogen, lower alkyl groups having one to four carbon atoms and the phenyl and tolyl radicals, and anions selected from the class of anions having the formulae:

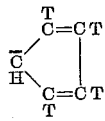

and

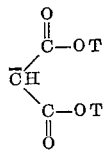

wherein T is selected from the class consisting of hydrogen, lower alkyl groups having one to four carbon atoms and the phenyl and tolyl radicals.

4. The process of claim 3 wherein the said Group VIB metal present in the tropylium-Group VIB metal-tricarbonyl cation reactant is chromium.

5. The process of claim 3 wherein said tropylium-Group VIB metal-tricarbonyl cation is the cation of the corresponding tropylium-Group VIB metal-tricarbonyl perchlorate salt.

6. The process of claim 1 wherein the said Group VIB metal present in the tropylium-Group VIB metal-tricarbonyl cation reactant is chromium.

7. The process of claim 1 wherein said tropylium-Group VIB metal-tricarbonyl cation is the cation of the corresponding tropylium-Group VIB metal-tricarbonyl perchlorate salt.

8. The process of claim 2 wherein the said Group VIB metal present in the tropylium-Group VIB metal-tricarbonyl cation reactant is chromium.

9. The process of claim 2 wherein said tropylium-Group VIB metal-tricarbonyl cation is the cation of the corresponding tropylium-Group VIB metal-tricarbonyl perchlorate salt.

10. The process of claim 2 wherein said anions are selected from the group consisting of those having the following formulae (a) 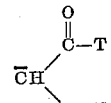

(b) 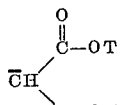

(c) 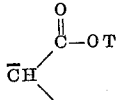

(d) 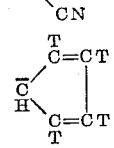

in which T is selected from the group consisting of hydrogen, lower alkyl groups having up to four carbon atoms and the lower aryl groups.

References Cited in the file of this patent

J.A.C.S., vol. 80, No. 20, Oct. 20, 1958, pp. 5570 and 5571.

Proceedings of the Chemical Society (London), September 1959, p. 267.